US010926813B2

(12) United States Patent
Guerin (10) Patent No.: US 10,926,813 B2
(45) Date of Patent: Feb. 23, 2021

(54) WIND DEFLECTOR FOR A VEHICLE TOWING A TRAILER

(71) Applicant: Luc Guerin, Granby (CA)

(72) Inventor: Luc Guerin, Granby (CA)

( * ) Notice: Subject to any disclaimer, the term of this patent is extended or adjusted under 35 U.S.C. 154(b) by 96 days.

(21) Appl. No.: 16/297,705

(22) Filed: Mar. 10, 2019

(65) Prior Publication Data
US 2020/0114984 A1   Apr. 16, 2020

(51) Int. Cl.
*B62D 35/00*   (2006.01)
*B62D 37/02*   (2006.01)

(52) U.S. Cl.
CPC ......... *B62D 35/002* (2013.01); *B62D 35/007* (2013.01); *B62D 37/02* (2013.01)

(58) Field of Classification Search
CPC ...... B62D 25/00; B62D 35/00; B62D 35/002; B62D 35/007; B62D 37/00; B62D 37/02
See application file for complete search history.

(56) References Cited

U.S. PATENT DOCUMENTS

| | | | | |
|---|---|---|---|---|
| 4,045,074 A * | 8/1977 | Howard | ............... | B62D 35/002 296/180.2 |
| 4,264,099 A * | 4/1981 | Pierce | ................ | B62D 35/002 296/180.2 |
| 4,863,213 A * | 9/1989 | Deaver | ............... | B62D 35/001 296/180.1 |
| 4,890,879 A * | 1/1990 | Hurlock | ............... | B62D 35/002 296/156 |
| 5,234,249 A * | 8/1993 | Dorrell | ............. | B62D 33/0273 296/180.1 |
| 5,236,242 A * | 8/1993 | Seeman | ............... | B62D 35/001 296/180.1 |
| 5,645,310 A * | 7/1997 | McLaughlin | ...... | B62D 33/0273 296/180.5 |
| 5,688,020 A * | 11/1997 | Burg | .................. | B62D 33/0273 296/180.1 |
| 5,735,567 A * | 4/1998 | Mora, Sr. | ............. | B62D 35/007 296/180.1 |
| 5,743,589 A * | 4/1998 | Felker | ................ | B62D 33/0273 296/180.5 |
| 6,206,444 B1 * | 3/2001 | Casey | ....................... | B60P 1/26 296/180.1 |
| 6,450,559 B1 * | 9/2002 | Renke | ....................... | B60P 7/08 296/57.1 |
| 6,857,678 B2 * | 2/2005 | Lisk, III | ................... | B60P 1/26 292/338 |

(Continued)

Primary Examiner — Christopher R Harmon (57) ABSTRACT

The present invention provides a wind deflector adapted for use with a truck pulling a trailer in conventional towing arrangement, with a towing hitch attached to the rear of the truck. The wind deflector has a panel that extends at an angle behind the rear end of the truck, such that the deflector panel acts as a wind deflecting surface that reduces the gap between the truck and the trailer and improves aerodynamic drag. The invention also provides an inclinable truck bed tailgate that can support the deflector. Tailgate can also be adapted for storing the deflector when not in wind deflecting position, and to extend the deflector for towing. The deflector can comprise multiple panel portions that can be folded together. The deflector brings fuel economy in the order of 18% with the truck and trailer vehicle combination, thereby lowering the environmentally harmful emissions.

18 Claims, 5 Drawing Sheets

(56) References Cited

U.S. PATENT DOCUMENTS

| | | | | |
|---|---|---|---|---|
| 7,090,287 B1* | 8/2006 | Eberst | ............... | B62D 33/0273 |
| | | | | 296/180.1 |
| 10,099,730 B1* | 10/2018 | Williams | ............. | B62D 35/007 |
| 2002/0163223 A1* | 11/2002 | Lehmann | ............. | B62D 35/007 |
| | | | | 296/180.1 |
| 2003/0221305 A1* | 12/2003 | Burg | ................... | B62D 35/007 |
| | | | | 29/407.1 |
| 2008/0315623 A1* | 12/2008 | Khalighi | ............ | B62D 33/0273 |
| | | | | 296/180.5 |
| 2018/0370581 A1* | 12/2018 | Williams | .............. | B62D 37/02 |

* cited by examiner

FIG. 1

Prior art

FIG. 2

Prior art

FIG. 3

Prior art

FIG. 4

Prior art

WIND DEFLECTOR FOR A VEHICLE TOWING A TRAILER

CROSS-REFERENCE TO RELATED APPLICATIONS

The present U.S. patent application claims priority to Canadian Patent Application number 3,020,556, filed on Oct. 12, 2018.

BACKGROUND OF THE INVENTION

In the conventional arrangement for towing a trailer with a tow vehicle, the trailer is attached to the rear of the tow vehicle by means of a towing hitch that is extending beyond the rear end of the tow vehicle, such hitch being located generally in the lower portion of the rear end of the tow vehicle. For the past several decades, pickup trucks have been one of the most commonly used type of tow vehicle for this conventional towing arrangement, per example for towing utility trailers, or camping trailers.

An alternative to conventional trailer towing arrangement is the $5^{th}$ wheel towing arrangement with pickup trucks, that is used also for the heavy tractor-trailer vehicle combinations. In this arrangement, the trailer extends over the rear portion of the tow vehicle, and the attachment between the tow vehicle and the trailer is made on the surface of the pickup truck bed, or the tractor attachment surface, according to the type.

What is common between all types of towing arrangement is the generally high and wide shape of trailers, and the important tow vehicle power requirements for towing at highway speeds, due to the important aerodynamic drag generated by the trailer height and width, and turbulence between the tow vehicle and trailer. Over the years, some efforts have been made, in order to improve the tow vehicle and trailer combination aerodynamics, in order to reduce the power requirements, and thereby the amount of energy or fuel required for travel.

Figure 1:
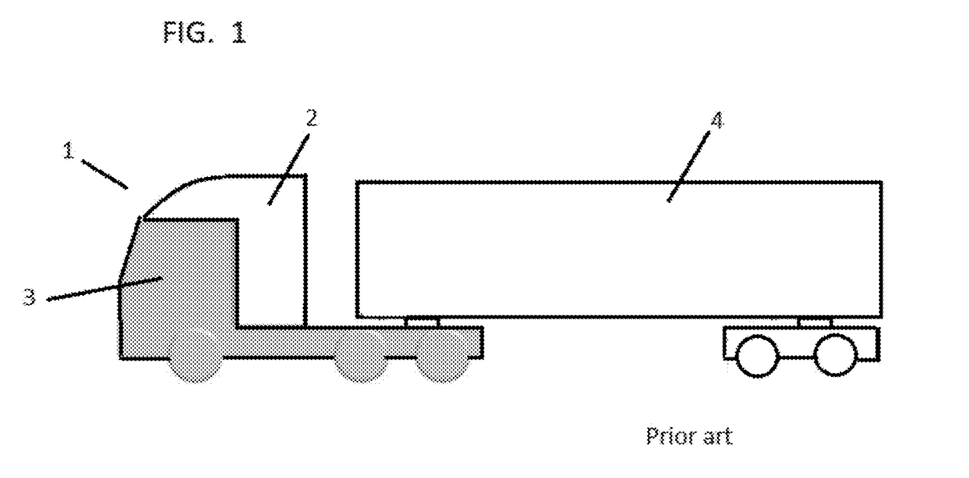
FIG. 1 is a schematic view of a semi-trailer tractor-trailer combination according to the prior art, showing wind deflectors used to reduce the gap between the cabin and the trailer.

In the area of commercial, heavy tractor-trailer vehicle combinations consisting of a semi-tractor and attached trailer, substantial research and development have been done in order to incorporate efficient wind deflectors to the tow vehicle, and aerodynamic improvements, as well as fuel consumption reductions have been observed. Per example, article "Substantial drag reduction of a tractor-trailer vehicle using gap fairings" by Kim and Lee, Journal of Wind Engineering and Industrial Aerodynamics•December 2017, describes some of the wind deflectors added to semi-trailer tow vehicles for heavy tractor-trailer towing configurations. FIG. 1 is a schematic view of a semi-trailer tractor-trailer combination (1), where substantial cabin-top and cabin-rear wind deflector was added (2), in order to reduce the gap between the cabin (3) and the trailer (4).

In the case of conventional trailer towing with pickup trucks, the type of wind deflector arrangements used on heavy tractor-trailer vehicles can not be used, due to the nature of the towing arrangement; pickup trucks comprise a cabin portion that is substantially higher than the bed portion, and the hitch of a conventional towing arrangement is located in the rear and bottom portion of the bed portion, extending basically horizontally rearward to connect to a trailer tongue, thereby the kind of deflectors that extend rearward from the cabin used in heavy tractor-trailer towing can not be used with a pickup truck, as they would block access to the sides of the bed of the pickup truck.

Figure 2:
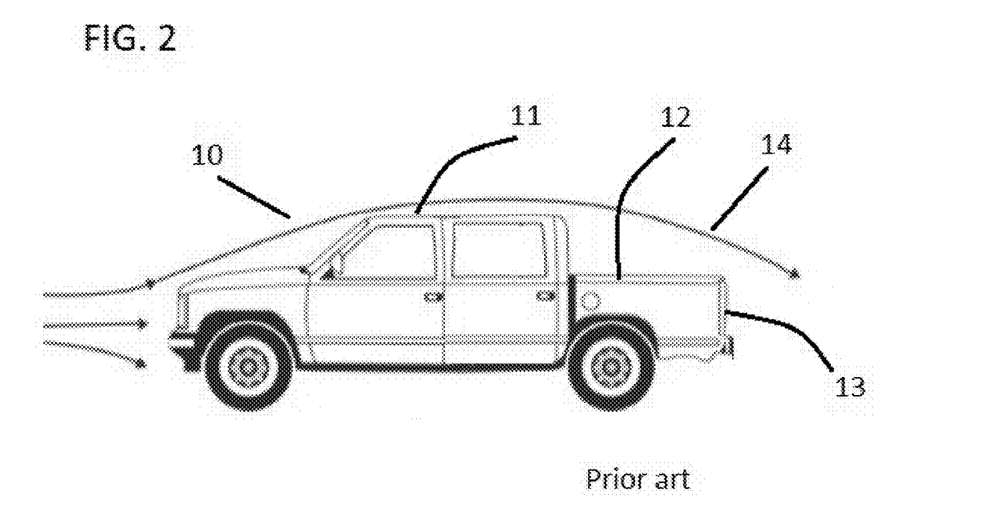
FIG. 2 shows a stand-alone pick-up truck travelling at highway speeds, with schematic air flow pattern observed in wind tunnel laboratory, as per prior art information.

FIG. 2 shows the air flow around a modern stand-alone pickup truck (10) travelling at highway speed. Truck companies have performed wind tunnel evaluations, and optimized the aerodynamic drag of these vehicles, to result in the air flow pattern that is shown in FIG. 2. An important amount of air flows over the cabin (11), and then the air flow goes down over the bed portion (12) in the open space located behind the cabin, and down again behind the bed portion, which is delimited by the tailgate (13) as shown from the air flow schematic arrow (14).

Figure 3:
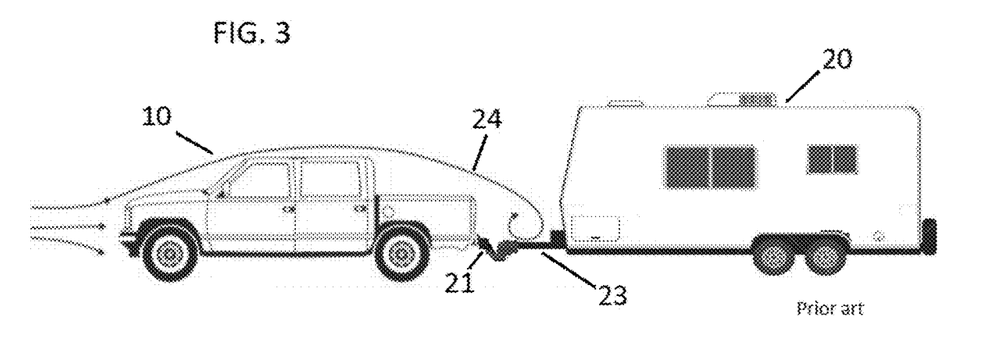
FIG. 3 shows a pickup truck and trailer combination as per the prior art conventional towing method, with arrow lines demonstrating turbulent air flow pattern.

When a trailer is towed behind such a pickup truck, there will be an impact to the aerodynamic behaviour of the vehicle combination. FIG. 3 shows a pickup truck (10) towing a trailer (20), in conventional towing arrangement. Pickup truck further includes a hitch (21) that is joined to the trailer at an attachment point where a hitch ball (not shown) receives the trailer tongue (23) that extends horizontally from the trailer front end. There is a substantial gap between the pickup rear end and the trailer front end, such large gap being required in order to allow for turning of the vehicle combination. The presence of this gap is very detrimental to the aerodynamics of the vehicle combination, because turbulent air gets entrapped between the pickup tailgate and the lower area of the trailer front end, in the gap area, as shown by the air flow schematic line (24) in FIG. 3.

The gap between the tow vehicle and the trailer is a large contributor to the longitudinal aerodynamic force in tow vehicle-trailer combinations. The gap is commonly expressed in non-dimensional form by $b/\sqrt{A}$, where b is the distance between the truck and the trailer, A the area in the zone. Generally, the smaller the gap, then the drag force will be reduced. The drag force due to the gap is zero for small gaps and increases suddenly when $b/\sqrt{A}$, is close to 0.5 and stabilizes at 0.7.

The gap was measured for a typical example of a pickup truck and trailer vehicle combination as shown in FIG. 3. The example vehicle combination consists of a 2015 Chevrolet Silverado 1500® pickup truck pulling a 2017 KZ-RV Connect® travel trailer. For a pickup truck and trailer, the gap is the volume of air between the wall of the tailgate (in vertical position) and the front wall of the trailer. The rear end of the truck is slightly rearward of the tailgate, and is considered to be located at the rear surface of the bumper. For that vehicle combination, the gap distance b is 126 cm, while the gap area between tailgate and trailer front wall is 138 cm×185 cm. Using these dimensions to calculate the non-dimensional gap indicator, we obtain: $b/\sqrt{A}=0.79$. This is indicative of high drag force, thereby indicating that the aerodynamic drag of the prior art combination of FIG. 3 is high, and will require important energy for towing.

Figure 4:
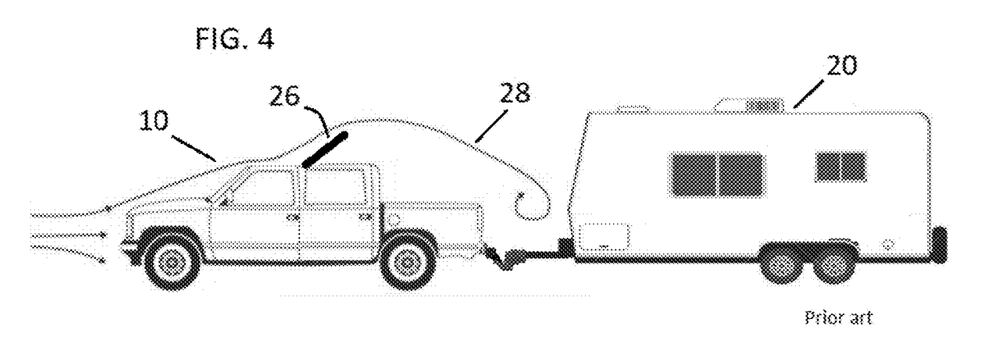
FIG. 4 shows a pickup truck and trailer combination, with a prior art cabin-top wind deflector attached, showing turbulent air flow pattern.

Wind deflectors placed on the top of the cabin of pickup trucks or other tow vehicles are known today, per example as shown in U.S. Pat. Nos. 3,768,854, 4,141,580, 4,264,099, 7455348B1, as well as German patent DE2815440A1, and French patent application FR2466382A1. Because of the large distance between the deflector and trailer (due to presence of pickup bed in between), these deflectors have limited performance when used for conventional towing with a pickup truck. This is illustrated schematically in FIG. 4, where a pickup truck (10) is towing a trailer (20), in conventional towing arrangement. A prior art cabin-top wind deflector (26) is positioned on the pickup, and the air resulting flow pattern is showed (28).

Also, internal bed deflectors for pickup trucks have been described in several prior art patents. Per example, U.S. Pat. Nos. 5,551,747, 5,722,714, 5,743,589 show angled deflectors that are placed inside the rear portion of the bed of a pickup trucks. These can possibly address aerodynamics of a stand-alone pickup, but are not designed to facilitate trailer towing, and bring no aerodynamic improvement to trailer towing, as they do not modify the air flow in the area of the gap located between the pickup and the trailer, as described in the previous paragraph. Some variants (per example as shown in U.S. Pat. No. 7,090,287B1) also incorporate a small tailgate end deflector, or spoiler. This feature is not intended for trailer towing, and have no substantial effect for reducing the gap between the pickup rear end and an eventual trailer because it does not extend substantially behind the rear end of the pickup, and thereby will not improve the aerodynamic behaviour of a pickup and trailer combination.

It is clear from the review of the prior art that there is a need for a solution to address the aerodynamic drag problem between the rear end of a tow vehicle and a trailer, in particular in the case of a pickup truck. This is particularly important with increasingly stringent fuel economy requirements and regulations to reduce the amount of environmentally harmful emissions.

BRIEF SUMMARY OF THE INVENTION

The present invention provides a wind deflector adapted for use with a truck or other tow vehicle that is pulling a trailer by means of a trailer tongue that is connected to a towing hitch that extends beyond the rear end of the tow vehicle.

The wind deflector has a panel that extends behind the rear end of the truck and projects towards the trailer front wall, such that the deflector panel top surface is acting as a wind deflecting surface that reduces the gap between the truck rear end and the trailer front wall when the truck is in forward motion. The wind deflector may extend rearward such that a portion of the panel overhangs a portion of the trailer tongue, such that the deflector panel rear edge is at a distance of less than one meter from the front wall of the trailer, and may be placed at an angle where the top surface is facing generally upward and forward and wherein the deflector panel extends upward such that the rear edge of the panel is located substantially higher than the side walls of the bed portion of the truck. Deflector panel also may have a width that is greater or equal to the external width of the bed portion of the truck.

The deflector panel may also be shaped such that it extends further in the center of its the rear edge than in the corners, thereby preventing the panel to touch the trailer front wall when the truck is turning. The means for mounting the deflector may comprise an inclinable truck bed tailgate located at the rear end of the truck bed that can be held in an angle position, to act as a support surface for a portion of the deflector panel bottom surface. The tailgate may also include support and storing means adapted to store the deflector when not in wind deflecting position, and to extend the deflector for towing, by sliding or folding the panel. The deflector panel may comprise multiple panel portions that can be folded together when not in place as a wind deflecting surface. The subject matter which is regarded as the invention is particularly pointed out and distinctly claimed in the claims at the conclusion of the specification. The forgoing and other features, and advantages of the invention are apparent from the following detailed description taken in conjunction with the accompanying drawings.

DETAILED DESCRIPTION OF THE INVENTION

Figure 5:
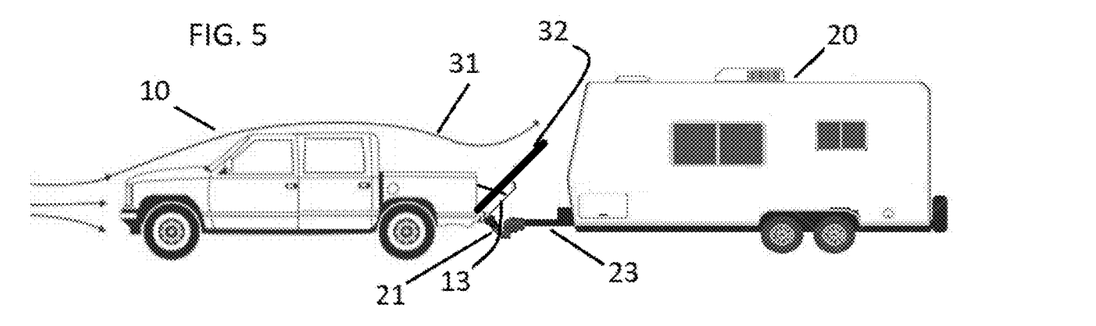
FIG. 5 shows a pickup truck and trailer combination with a wind deflector according to the present invention, and the improved air flow pattern that is obtained with the new deflector.

FIG. 5 is an overall side view of a pickup truck (10) towing a trailer (20), showing the positioning of the wind deflector of the present invention. The deflector has a panel (32) that extends rearward and upward from the rear end of the pickup truck, towards the front wall of the trailer, as close as possible to the front wall of the trailer and horizontally farther away from the rear of the pickup than the hitch (21), such that the deflector panel overhangs the tongue portion of the trailer (23). The tailgate (13) acts as a support for the lower portion of the deflector panel bottom surface. The top surface of the deflector panel acts as a wind deflecting surface during travel, thereby significantly reducing the gap between the truck and the trailer, and generating an improved aerodynamic drag.

Figure 6:
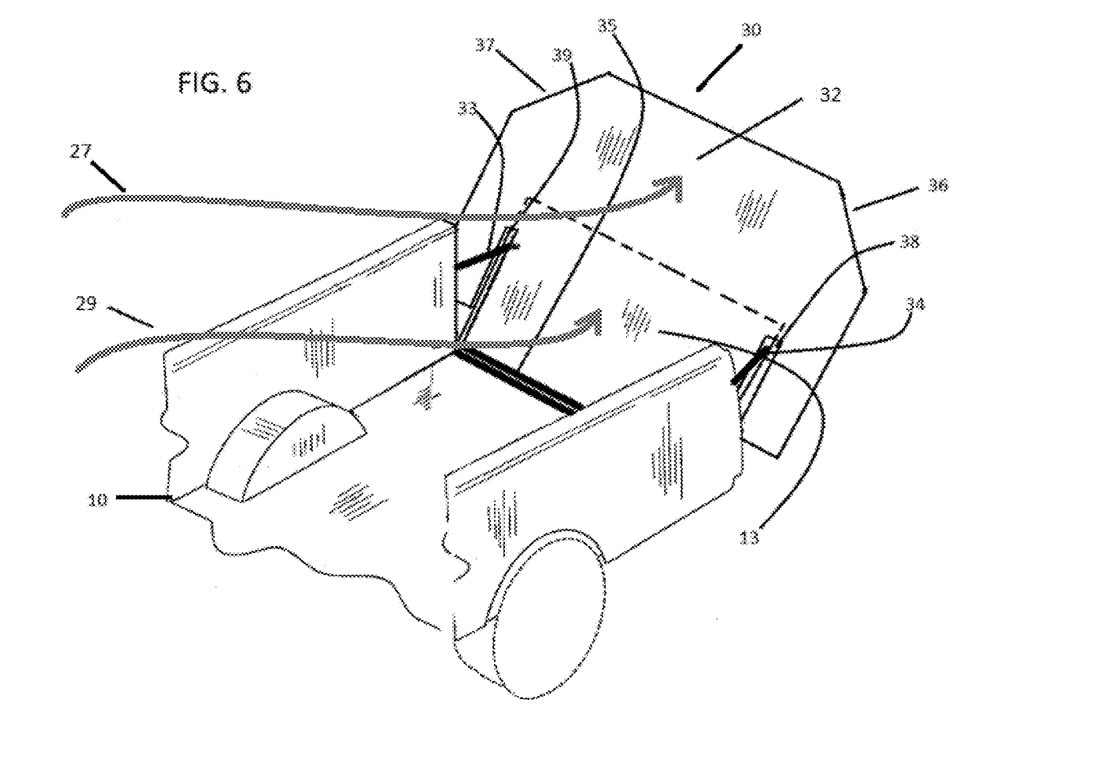
FIG. 6 Shows a detailed view of a preferred embodiment of the deflector according to the present invention.

FIG. 6 shows in more details a preferred embodiment of the deflector (30) of the present invention, positioned in the rear of the bed of a pickup truck. This design is optimized for cost and simplicity of construction, and simplicity of attachment and removal of the deflector into the pickup. In FIG. 6, pickup truck (10, rear end only shown), has its tailgate (13, shown in phantom lines) opened to an angle of approximately 45 degrees, and in this position the front interior surface of the tailgate acts as an efficient support for a portion of the deflector panel (32). The tailgate is maintained at angle by means of a pair connecting bars (33, 34) that are inserted at the latch and pin portions of the tailgate opening and closure mechanism. Alternatively, this angled tailgate position can be obtained by use of existing pickup tailgate cables (which can be wrapped around tail gate latch pins), or by use of a mechanism in the tailgate hinge, that can be motorized or not.

As can be seen from FIG. 6, the deflector panel (32) extends substantially outwardly from the end of the tailgate (13), in this specific embodiment by a distance of 58 cm, and has a total width of 198 cm, which is slightly wider than that of the pickup bed portion. In addition to being close to the front wall of the trailer, the deflector panel must have substantial width, in order to avoid turbulence caused by side movement of the air in the gap between the pickup and the trailer. The deflector panel should also vertically extend higher than the pickup bed side walls, to minimize turbulence. Also, as can be seen in FIG. 6, the front edge of the deflector panel is positioned substantially lower than the bed side walls, in that case near the floor surface of the bed. In this position, during travel, the incoming air flow applies pressure to both the bottom portion and upper portion of the deflector panel, thereby improving the stability of the deflector during travel, and reducing the risk for the deflector to tilt rearward over the edge of the tailgate. Incoming air flow lines schematically show this concept in FIG. 6. Upper air flow line (27) represents air pressure applied to the upper portion of the deflector panel (the portion that extends above top edge of the tailgate). Lower air flow line (29) represents air pressure applied to the lower portion of the deflector panel (portion that is supported by the tailgate).

In addition, a bed bottom bar (35) is used to secure the base of the deflector panel. Deflector panel is placed with its rear end facing the tailgate interior surface, and extending outwardly past the tailgate, and past the trailer attachment point, at the same angle of approximately 45 degrees, to help deflect wind in the upper portion of the front wall and over the trailer. Wind deflector panel (32) has a flat surface that can be made of any suitable material (plastic, fiberglass, metal, plywood, canvas, or other). Clear plastic is an advantageous material option, for reason of visibility. Curved panel surfaces can be considered for reasons of air deflection or other.

It is not essential that the deflector panel is made of a single piece of material, it can consist of several smaller panels that are joined together in a fixed arrangement, or alternatively separable or flexibly or foldably joined. Also, a combination of multiple smaller panels can have some surface variations, where per example one panel portion is in a different plane or curved plane than an other panel portion. These different arrangement possibilities would still enable proper operation and performance of the deflector, without departing from the scope of the invention.

In order to minimize the distance between the deflector and the trailer front wall, the deflector panel rear edge is preferably shaped such that the panel extends further rearward in the center than in the corners, in order to be as close as possible in its central portion to the trailer wall, and at same time avoid contact between the trailer front wall and the deflector when the pickup truck is turning. In this embodiment, deflector panel comprises two cut-out corners (36, 37) for that purpose.

Alternatively, the shape of the cut-outs can be curved, and also corners of the deflector panel can have the shape of an upwardly curved surface, to achieve the same purpose of avoiding contact with the trailer when turning. Optionally, cables or elastics (not shown) can be used to securely maintain deflector in place during travel. Two slots (38, 39) are incorporated in the side portion of the deflector panel, in order to accommodate the tailgate connecting bars. In this embodiment, the deflector panel is made of one piece, and is removed and replaced manually from the tailgate positioned at the proper angle, and can be stored in any location when not in use. Also, the presence of the deflector does not prevent the use of a generally flat cover over the bed portion of the pickup, per example, of the type known in the field as tonneau cover.

With the deflector as described above and showed in FIG. 6, the gap was re-measured for the same typical example vehicle combination as discussed in the prior art section, but with the deflector of the present invention in position, as shown in FIG. 5. For this configuration, the gap is the volume of air between the end of the deflector panel and the front wall of the trailer. The rear end of the truck is slightly rearward of the tailgate, and is considered to be located at the rear surface of the bumper. In that case, the gap distance b is reduced to 65 cm, while the gap area between tailgate and trailer front wall is 170 cm×185 cm. Consequently, for the non-dimensional gap indicator we now obtain: $b/\sqrt{A}=0.37$, which is indicative of lower drag force than the prior art result (without deflector $b/\sqrt{A}=0.79$, as mentioned in the background section), thereby suggesting that the aerodynamics behaviour of the combination of FIG. 5 is significantly better than that of the prior art as shown in FIG. 3.

In general, the target for $b/\sqrt{A}$ number should be in the range of 0.5 or lower, and, as a general indicator, for most types of pickup trucks and trailers in this arrangement, the gap distance b, between the rear edge of the deflector panel and the front wall of the trailer, should be advantageously maintained below 100 cm, in order to achieve that value for $b/\sqrt{A}$. Therefore the wind deflector panel should minimally extend at least 30 cm behind the rear end of the pickup. Consequently the wind deflector panel would typically extend rearward of the truck hitch, and overhang partly the trailer tongue, and extend to a height that is at least equal to the that of the side walls of the pickup bed, to minimize turbulence. Angle of the deflector can be different from 45 degrees, depending of the configuration. Also, the deflector panel front edge is advantageously positioned substantially lower than the bed side walls, to expose the panel to more uniform air flow and pressure, thereby improving its stability during travel.

Systematic approach is required in order to evaluate the performance of a wind deflector. Fuel consumption is a good indicator, but environmental conditions such as wind direction, air temperature, hills (even minor), will have an important effect on the fuel consumption of a vehicle, in particular for a poorly aerodynamic vehicle or vehicle combination, like that of a pickup towing a travel trailer or utility trailer. Per example if we compare the fuel consumption obtained on a particular course on two different days, we may have different results, as the wind speed, wind direction, temperature might vary.

In order to obtain accurate measure of the new deflector performance, the same course was traveled in back and forth directions with deflector, and then without deflector, in a controlled and limited time period, thereby with equivalent environmental conditions, in order to evaluate what fuel consumption reduction could be obtained with the new wind deflector. Same tow vehicle (2015 Chevrolet Silverado 1500 pickup truck) pulling the same trailer (2017 KZ-RV Connect® travel trailer), was used for all trip sections. Same road (Quebec highway 10) was traveled in both directions, with new deflector (like shown in FIG. 5), and without deflector (like shown in FIG. 3), for a distance of 31 km in toward East, from Exit 68 to 37, and 31 km toward West, from Exit 37 to 68. This road section is flat, and traffic conditions were light, such that all trip sections could be performed at constant speed using the cruise control system of the pickup, and speed was set at 102 km/h. (63.4 mph). Fuel consumption was measured using the embedded pickup truck fuel consumption monitor. Regular unleaded gasoline was used for the experiment. The table below summarizes the results:

| Trip Section | Direction | Use of deflector | Average Fuel Consumption (l/100 km) | Average Fuel Consumption (MPG U.S.) |
|---|---|---|---|---|
| Km 68 to 37 | West | Without | 23.7 | 9.9 |
| Km 37 to 68 | East | Without | 22.8 | 10.3 |
| Total (62 km) | West and East | Without | 23.25 | 10.1 |
| Km 68 to 37 | West | With | 19.8 | 11.9 |
| Km 37 to 68 | East | With | 19.7 | 11.9 |
| Total (62 km) | West and East | With | 19.75 | 11.9 |
| Fuel consumption saving with new deflector: | | | 3.5 l/100 km reduction | 18 percent MPG improvement |

Conclusion: As shown in the bottom line of the table, improvement of 18% of fuel consumption was obtained with the new deflector, on the exact same trip, with same environmental conditions (because performed on same day, immediately one after the other), and all other variables controlled to be equal. This corresponds to a saving of 3.5 liters of gasoline saved every 100 km traveled, or 0.1.36 US gallons every 100 miles traveled. Results may vary slightly depending of the truck and trailer arrangement and dimensions, but are representative of what most pickup and travel trailer can obtain, because the combination used for this experiment is equivalent to the mostly used ones. Fuel consumption, although a very important benefit of the inventive wind deflector, is also an indicative of the improvement obtained in aerodynamic drag of the vehicle combination, and of energy savings of any type that can be obtained with the deflector, in similar vehicle configuration, regardless if the tow vehicle is propelled with fuel, gasoline, electricity, an hybrid combination of these, or any other source of energy. Per example, in the case of an electrically powered tow vehicle, use of the wind deflector would result in battery life improvement. Absolute results can vary depending of wind conditions, but the amount of improvement brought by the presence of the deflector over the absence of deflector will be substantially the same in all wind conditions.

Figure 7:
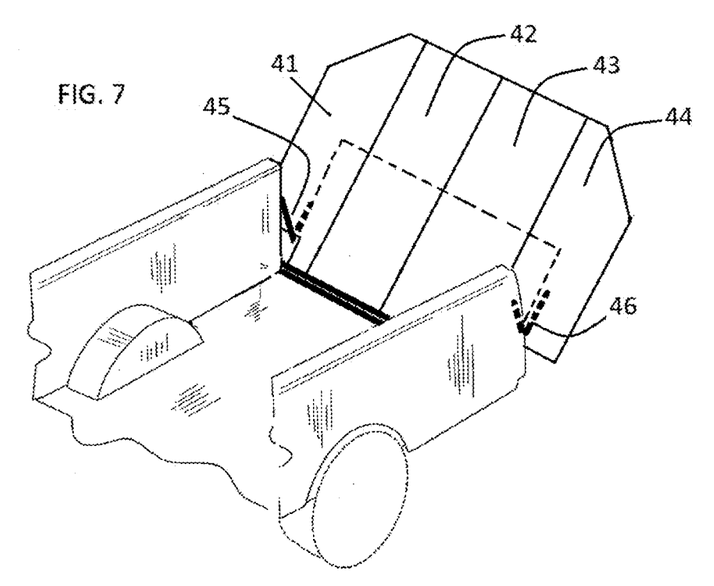
FIG. 7 Shows an alternate embodiment of the deflector, wherein the deflector comprises multiple smaller panel portions.

Alternate embodiments are possible, and can enable easier handling of the deflector. Per example, FIG. 7 shows an alternate embodiment where the deflector panel is split into 4 panel portions (41,42,43,44), that can be handled separately, or can be hingedly joined together, to allow them to be folded with one another, in order to provide a smaller format for handling and storage. This deflector arrangement, having the same total dimension and position as the one-piece embodiment of FIG. 6, will have the same performance, but easier handling. Panel portions can have their side edges in contact to one another, or alternatively, there can be an overlap between some edge sections of the panel portions. FIG. 7 also shows also an alternate design for the connecting bars (45, 46) that hold the tailgate at an angle, in that case they have the shape of a V, thereby eliminating the slots in the deflector panel that were needed as a clearance for the straight bars of the previous embodiment.

Figure 8:
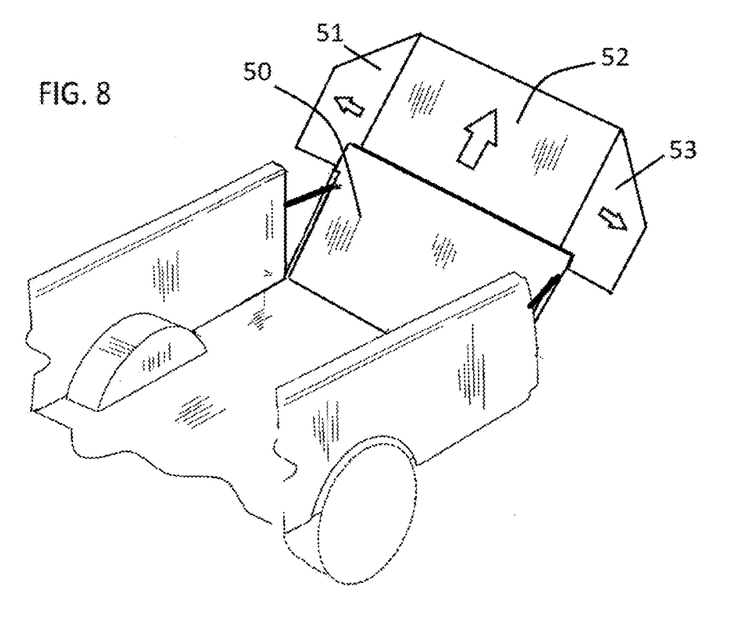
FIG. 8 Shows another alternate embodiment of the deflector, wherein the deflector panel can be embedded and extracted from inside internal walls of the tailgate.
Figure 9:
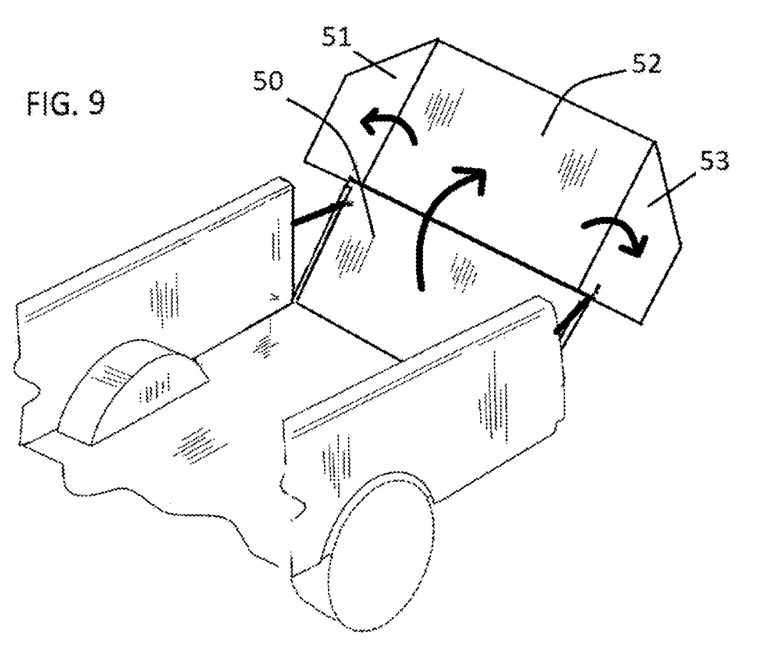
FIG. 9 Shows another alternate embodiment of the deflector, wherein the deflector panel can be hingedly flipped from a closed to an opened position.

Another approach is to use a modified tailgate that further includes support and storing means adapted to store the deflector when not in wind deflecting position, and to extend the deflector into wind deflecting position for towing. Per example, as in FIG. 8, the deflector panel can be held within the walls of a purposely adapted tailgate, or between the tailgate and a deflector support wall (50) of similar size as the tailgate itself, from where the deflector panel can be extended outwardly from the tailgate, in a similar fashion to a passenger window embedded into a car door. This can be done either with a deflector comprising a single panel, or multiple panel portions. FIG. 8 shows this approach, wherein panel portions (51, 52, 53) can slide out from the tailgate assembly, in directions showed by the arrows. Also, the deflector panel could be hingedly attached to the tailgate, and the panel could be flipped between an extended position and a folded position, as shown in FIG. 9.

There are several alternative ways of achieving the same deflector performance, and those skilled in the art can propose additional alternatives. Per example, deflector could be located completely outside the tailgate, per example supported on the vehicle bumper and extending rearward from this location, allowing the tailgate to be left in vertical closed position for travel. Also, side fairings panels can be added to the deflector, to restrict lateral air flow, and also provide closure of the triangular opening between the partly opened tailgate and the pickup bed walls.

The terminology used herein is for the purpose of describing particular embodiments only and is not intended to be limiting of the invention. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

While the preferred embodiment of the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A wind deflector for directing the air flow behind a truck towing a trailer, said trailer having a tongue extending forwardly from a front wall of the trailer, said truck comprising a front end, a rear end, and a cabin portion located in front of a bed portion having a floor and side walls, said side walls being lower than the cabin portion, thereby creating an open space located behind the cabin and over the bed portion of the truck, and a towing hitch extending rearward of the truck rear end, the hitch being connected to the trailer tongue, thereby leaving an air gap between the truck rear end and the trailer front wall, the wind deflector comprising:

a) a deflector panel having a top surface, a bottom surface, a front edge and a rear edge,
b) means for mounting the deflector panel to the bed portion of the truck, wherein said panel extends rearward behind the rear end of the truck, and extends upward such that the rear edge of the panel is located substantially higher than the side walls of the bed portion of the truck, whereby the deflector panel top surface is at an angle and facing generally upward and forward, thereby acting as a wind deflecting surface and reducing the gap between the truck rear end and the trailer front wall when the truck is in forward motion.

2. The wind deflector of claim 1, wherein the deflector panel extends rearward such that a portion of the panel overhangs a portion of the trailer tongue, and such that the deflector panel rear edge is at a distance of less than one meter from the front wall of the trailer.

3. The wind deflector of claim 1, wherein the deflector panel rear edge is shaped such that the panel extends further rearward in the center of the rear edge than in the corners, thereby preventing the panel to touch the trailer front wall when the truck is turning.

4. The wind deflector of claim 1, wherein the deflector panel has a width that is greater or equal to the external width of the bed portion of the truck.

5. The wind deflector of claim 1, wherein the deflector panel front edge is positioned substantially lower than the top of the side walls of the truck bed, such that the deflector panel receives a substantially uniform air flow during travel, thereby improving the stability of the deflector panel.

6. The wind deflector of claim 1, wherein the means for mounting the deflector panel comprises an inclinable truck bed tailgate located at the rear end of the truck bed, the tailgate comprising a front interior surface and a top edge, means for holding the tailgate at an angled position, wherein the tailgate is inclined at an angle such that the front interior surface of the tailgate is acting as a support surface for a portion of the deflector panel bottom surface, and wherein the deflector panel extends rearward and upward further than the tailgate top edge.

7. The wind deflector of claim 6, wherein the means for mounting the deflector panel include means for securing the front edge of the deflector panel to the tailgate interior surface.

8. The wind deflector of claim 6, wherein the deflector panel rear edge is shaped such that the panel extends further rearward in the center of the rear edge than in the corners, thereby preventing the panel to touch the trailer front wall when the truck is turning.

9. The wind deflector of claim 6, wherein the deflector panel has a width that is substantially wider than the width of the tailgate.

10. The wind deflector of claim 1, wherein the means for mounting the deflector panel comprise an adapted inclinable truck bed tailgate located at the rear end of the truck bed, the tailgate comprising a front interior surface, a top edge, and support and storing means adapted to store the deflector panel into a stored position, and to extend the deflector panel into an extended position for deflecting wind when towing, wherein the deflector panel extends rearward and upward further than the tailgate top edge.

11. The wind deflector of claim 10, wherein the tailgate support and storing means include sliding means to allow sliding of the deflector panel from the stored to the extended position.

12. The wind deflector of claim 10, wherein the deflector panel is hingedly joined to the tailgate and can be folded from the extended position to the stored position.

13. The wind deflector of claim 6, wherein the deflector panel comprises multiple panel portions.

14. The wind deflector of claim 13, wherein at least a portion of said panel portions are hingedly joined, thereby allowing the panel portions to be folded together when not in place as a wind deflecting surface.

15. A wind deflector for directing the air flow behind a tow vehicle towing a trailer, said trailer having a tongue extending forwardly from a front wall of the trailer, said tow vehicle comprising a front end, a rear end, and a towing hitch extending rearward of the tow vehicle rear end that is connected to the trailer tongue, thereby creating an air gap between the tow vehicle rear end and the trailer front wall, the wind deflector comprising:
a) a panel having a top surface, a bottom surface, a front edge and a rear edge,
b) means for mounting the deflector panel to the rear portion of the tow vehicle, wherein said panel extends behind the rear end of the tow vehicle, and wherein a portion of the panel overhangs a portion of the trailer tongue, and wherein the deflector panel rear edge is at a distance of less than one meter from the front wall of the trailer, whereby the deflector panel reduces the gap between the tow vehicle rear end and the trailer front wall when the tow vehicle is in forward motion.

16. The wind deflector of claim 15, wherein the deflector panel rear edge is shaped such that the panel extends further in the center of the rear edge than in the corners, thereby preventing the panel to touch the trailer front wall when the truck is turning.

17. The wind deflector of claim 16, wherein the deflector panel comprises multiple panel portions.

18. A pickup truck for towing a trailer, said trailer having a tongue extending forwardly from a front wall of the trailer, said pickup truck comprising:
a) a front end, a rear end, and a cabin portion located in front of a bed portion having a floor and side walls, said side walls being lower than the cabin portion,
b) an inclinable tailgate, the tailgate comprising a front interior surface and a top edge,
c) a towing hitch extending rearward of the pickup truck rear end, the hitch being connected to the trailer tongue, thereby leaving an air gap between the pickup truck rear end and the trailer front wall,
d) a wind deflector comprising a panel having a top surface, a bottom surface, a front edge and a rear edge,
e) means for holding the tailgate at an angled position, wherein the tailgate is inclined at an angle such that the front interior surface of the tailgate is acting as a support surface for a portion of the deflector panel bottom surface, and wherein the deflector panel extends rearward and upward further than the tailgate top edge, whereby the deflector panel top surface is at an angle and facing generally upward and forward, thereby acting as a wind deflecting surface and reducing the gap between the pickup truck rear end and the trailer front wall when the pickup truck is in forward motion, wherein the tailgate further comprises support and storing means adapted to store the deflector panel into a stored position, and to extend the deflector panel into an extended position for deflecting wind when towing.

* * * * *